United States Patent [19]

Kudchadker et al.

[11] 4,021,356

[45] May 3, 1977

[54] ALKOXYLATED ASPHALTS AS CO-SURFACTANTS IN SURFACTANT OIL RECOVERY PROCESSES USABLE IN FORMATIONS CONTAINING WATER HAVING HIGH CONCENTRATIONS OF POLYVALENT IONS SUCH AS CALCIUM AND MAGNESIUM

[75] Inventors: Mohan V. Kudchadker; Thad O. Walker, both of Houston; William Schoen, Missouri City, all of Tex.

[73] Assignee: Texaco Inc., New York, N.Y.

[22] Filed: Sept. 10, 1975

[21] Appl. No.: 612,114

[52] U.S. Cl. .................... 252/8.55 D; 166/273;
166/274; 208/44; 252/351
[51] Int. Cl.² ........................................ E21B 43/22
[58] Field of Search ............... 252/8.55 D, 351;
208/44; 166/273, 274, 275

[56] References Cited

UNITED STATES PATENTS

| | | | |
|---|---|---|---|
| 3,508,612 | 4/1970 | Reisberg et al. | 166/274 |
| 3,811,505 | 5/1974 | Flournoy et al. | 166/274 |
| 3,811,507 | 5/1974 | Flournoy et al. | 166/274 |

FOREIGN PATENTS OR APPLICATIONS 168,398  11/1965  U.S.S.R.

*Primary Examiner*—Herbert B. Guynn
*Attorney, Agent, or Firm*—Carl G. Ries; Thomas H. Whaley; Kenneth R. Priem

[57] ABSTRACT

Ethoxylated asphalt solutions have high tolerance for sodium and calcium ions as well as magnesium and other divalent ions. The use of ethoxylated asphalts in combination with other surfactants that normally precipitate out in the presence of these cations results in a stable surfactant solution wherein the surfactant will not precipitate out and wherein the surfactant solution has the ability to efficiently sweep oil from subterranean hydrocarbon reservoirs.

6 Claims, No Drawings

ALKOXYLATED ASPHALTS AS CO-SURFACTANTS IN SURFACTANT OIL RECOVERY PROCESSES USABLE IN FORMATIONS CONTAINING WATER HAVING HIGH CONCENTRATIONS OF POLYVALENT IONS SUCH AS CALCIUM AND MAGNESIUM

BACKGROUND OF THE INVENTION

1. Field of the Invention

This invention relates to a method for recovering petroleum from subterranean petroleum containing formations and more particularly to a surfactant flooding method for recovering petroleum from petroleum containing formations. Still more specifically, this invention pertains to a novel surfactant mixture which will function effectively in the presence of formation waters containing high polyvalent ion concentrations, e.g., high calcium or magnesium concentrations. which cause precipitation of conventional surfactants, and to a method for using such novel surfactant compositions in a surfactant flooding process for recovering petroleum.

2. Description of the Prior Art

Petroleum is normally recovered from subterranean formations in which it has accumulated by penetrating said formations with one or more wells and pumping or permitting the petroleum to flow to the surface through these wells. Recovery of petroleum from such petroleum containing formations is possible only if certain conditions are satisfied. There must be adequately high concentration of petroleum in the formation, and there must be sufficient porosity and permeability or an interconnected flow channel throughout the formation to permit the flow of fluids therethrough if sufficient pressure is applied to the fluid. When the subterranean petroleum containing formation has natural energy present in the form of an underlying active water drive or gas dissolved in the petroleum which can exert sufficient pressure to drive the petroleum to the producing well or a high pressure gas cap above the petroleum within the petroleum reservoir, this natural energy is utilized to recover petroleum. Recovery of petroleum by utilization of natural energy is referred to as primary recovery. When this natural energy source is depleted in the instance of those formations which do not originally contain sufficient natural energy to permit primary recovery operations, some form of supplemental recovery process must be utilized in order to extract petroleum from the subterranean petroleum containing formation. Supplemental recovery is frequently referred to as secondary recovery, although in fact it may be primary, secondary or tertiary in sequence of employment.

Water flooding which involves the injection of water into the subterranean petroliferous formation for the purpose of displacing petroleum for the producing well is the most economical and widely practiced supplemental recovery method. Water does not displace petroleum with high efficiency however, as water and oil are immiscible and also because the interfacial tension between water and oil is quite high. Persons skilled in the art of oil recovery have recognized this weakness of waterflooding and many additives have been described in the prior art for decreasing the interfacial tension between the injected water and the formation petroleum. For example, U.S. Pat. No. 2,233,381 (1941) disclosed the use of polyglycol ether as a surface active agent or surfactant to increase the capillary displacement efficiency of an aqueous flooding medium. U.S. Pat. No. 3,302,713 discloses the use of petroleum sulfonate prepared from the 850° to 1,050° F. boiling range fraction of petroleum crude as a surfactant for use in oil recovery operations. U.S. Pat. No. 3,468,377 (1969) describes the use of petroleum sulfonates of a specified molecular weight for oil recovery. Other surfactants which have been proposed for oil recovery include alkyl sulfates, alkyl sulfonates, and quaternary ammonium salts.

The above described surfactants are satisfactory for surfactant flooding in petroliferous formations only if the calcium and magnesium concentration of the formation water is low, generally well below about 500 parts per million. Petroleum sulfonate is one of the most popular and desirable surfactants because of its high surface activity and low unit cost, although it suffers from the limitation that it can only be used when the total formation water hardness (calcium plus magnesium) is less than about 500 parts per million. If the formation water calcium and/or magnesium content exceeds about 500 parts per million, petroleum sulfonates precipitate rapidly. When precipitation of the added material occurs, not only is the desired beneficial result lost, but plugging of the formation will very likely result.

Many subterranean petroleum containing formations are known to exist which contain polyvalent ions such as magnesium and calcium in concentrations far in excess of 500 parts per million, the most common of such reservoirs are limestone formations which may have polyvalent ion concentrations from 1,000 to as high as 20,000 parts per million in the original connate water, and the formation water after the formation has been subject to flooding with fresh water may have concentrations of calcium and/or magnesium from about 500 to about 15,000 parts per million. Since surfactants usable for oil recovery operations precipitate when exposed to aqueous environments having a total hardness in excess of about 500 parts per million, such surfactants could not be used in limestone reservoirs. If an aqueous solution of petroleum sulfonates, for example, were injected into a limestone reservoir, the petroleum sulfonate would precipitate immediately on contacting the high calcium containing formation water. In such a process, the flood water would have essentially no surfactant present in it to decrease the interfacial tension between the water and the petroleum. Furthermore, precipitated petroleum sulfonate plugs the small flow channels in the subterranean petroleum containing formation, decreasing the formation porosity and injectivity, thereby causing a substantial decrease in the oil displacement efficiency.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not economically feasible for several reasons. Nonionic surfactants are not as effective on a per unit weight basis as are the more commonly used anionic surfactants, and furthermore, the nonionic surfactants have a higher cost per unit weight than do the anionic surfactants.

Thus, it can be seen that while many surfactants have been proposed for supplemental oil recovery use, there is a substantial, unfilled need for a surfactant system usable in the presence of formation waters containing calcium and/or magnesium in excess of 500 parts per million.

SUMMARY OF THE INVENTION

This invention pertains to a novel cosurfactant for use in reservoirs wherein the calcium and/or magnesium concentration is above about 500 parts per million. The novel co-surfactants are alkoxylated asphalts. The alkoxylated asphalts are to be used in combination with other surfactants such as anionic or cationic surfactants which have a tendency to precipitate out of solution when the calcium and/or magnesium salt concentration rises above about 500 parts per million. These novel surfactant solutions are comprised of an aqueous solution of from about 0.05 to about 5.0 percent by weight of an anionic and/or cationic surfactants and from 0.05 to about 5.0 percent by weight of ethoxylated asphalts. The anionic surfactants may comprise for example, a water soluble salt, an alkyl or an alkylaryl sulfonate or phosphate, for example, sodium dodecyl benzene sulfonate.

DESCRIPTION OF THE PREFERRED EMBODIMENT

This invention concerns a novel, multiple surfactant system which can be used in subterranean petroleum containing formations which also contain hard water, or water having polyvalent ions such as calcium and/or magnesium dissolved therein in a concentration exceeding 500 parts per million. There are many petroleum containing formations which contain water having calcium and/or magnesium concentrations above about 500 parts per million; the most common of such formations being limestone. These formations frequently contain a substantial amount of petroleum after primary production and even after waterflooding, but surfactant flooding cannot be employed in them because surfactants previously proposed for oil recovery are insoluble or otherwise ineffective in the presence of calcium and/or magnesium in amounts above about 500 parts per million.

We have found that an aqueous solution of two surfactant materials, in a critical concentration range, will effectively reduce the interfacial tension between oil and water and will function effectively in the presence of calcium and magnesium in concentrations above about 500 parts per million total hardness. The dual surfactant system comprises:

1. an anionic surfactant having one of the following general formulas:

[R — X]Y  (a)

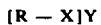

wherein R is an alkyl radical, linear or branched, having from 5 to 25 and preferably from 8 to 14 carbon atoms, X is an oxygen-containing anionic radical, either a phosphate ($PO_4$) or sulfonate ($SO_3$), and Y is a monovalent cation such as sodium, potassium or ammonium, or

wherein R, X and Y have the same meaning as above. For example if R is a linear dodecyl, X is sulfonate and Y is ammonia, the material is ammonium dodecyl benzene sulfonate.

2. an alkoxylated asphalt.

Many types of asphalts are useful in the process of this invention. The American Society for Testing and Materials defines asphalts as "A dark brown to black cementitious materials solid or semi-solid in consistency, in which the predominating constituents are bitumens which occur in nature as such or are obtained as residua in refining petrolum." Thus, asphalts occur naturally or may be obtained as residues in petroleum refining. The Kirk-Othmer Encyclopedia of Chemical Technology Volume 2 at pages 762 to 789 discusses the general characteristics of various types of asphalts.

Petroleum derived asphalts may be further divided into straight reduced asphalts which are obtained in reduced pressure stills precipitated with propane or butane. Also, asphalts may be obtained from the residues of cracking operations. Petroleum derived asphalts may also be of the air blown variety.

Naturally occurring asphalts include gilsonite, grahamite, glance pitch, Burmudez, rock asphalts and Trinidad.

Many other examples of both petroleum derived and natural asphalts could be given but the above description will apprise those skilled in the art of asphalt stocks acceptable for use in this invention.

Since the asphalt is to be alkoxylated it must contain active hydrogens. Determination of the active hydrogen content of any particular stock is easily determined by known analytical techniques.

The preferred alkylene oxide for reacting with the asphalts in our invention are ethylene oxide and propylene oxide or mixtures thereof so that the resulting alkoxylated asphalt is water soluble. Most preferably, ethylene oxide or a major amount of ethylene oxide and a minor amount of propylene oxide should be used. The ratio of alkylene oxide to asphalt should be such that the resulting product is water soluble. A suggested range of ethoxylation is from about 20 to about 800 moles of ethylene oxide per mole of asphalt. This range is given only as a guide. One skilled in the art will recognize that the proper amount of alkoxylation will depend on many variables including the type of asphalt, the type of formation, water salinity and the type of surfactant in the flood.

The term surfactant encompasses a broad spectrum of materials which share the following common characteristics:

1. The compound must be at least slightly soluble in at least one phase of a liquid system,
2. The compound must have an amphipatic structure (the molecule is composed of groups with opposing solubility tendencies). For use in oil recovery operations, the molecule must have at least one hydrophobic or oil soluble group and at least one hydrophilic or water soluble group.
3. The surfactant molecules or ions must form oriented monolayers at phase interfaces.

4. The equilibrium concentration of the surfactant in any particular solute at the phase interface is greater than the concentration of the surfactant in a bulk of the solution.

5. The material must tend to form micelles or aggregates of molecules or ions whenever the concentration exceeds a certain limiting value which is a characteristic of the particular surfacant and solute 6. The material must exhibit some combination of the following functional properties:

Detergency, foaming, wetting, emulsifying, solubilizing, and dispersing.

Surfactants are generally classified on the basis of the type of hydrophilic or water soluble group or groups attached to the molecule, generally being classified as anionic, cationic, or nonionic, as described below more fully.

Anionic surfactants are those surfactant materials wherein the hydrophilic or water soluble group is a carboxylate, sulfonate, sulfate, or phosphate group. This is the most important class of surfactants. Anionic surfactants are readily available, inexpensive, and have a high degree if surface activity. Petroleum recovery operations will generally involve the use of anionic surfactants unless there is some objection to the use of anionic surfactants or some sufficient reason to resort to the use of other compounds. Petroleum sulfonates are currently very popular anionic surfactants for oil recovery and they are prepared by isolating a preselected boiling range fraction of the crude oil and subjecting it to sulfonation. Although this material is desirable for use because of its low unit cost, there are problems associated with the use of petroleum sulfonates because of the complex nature of the hydrophobic or oil soluble portion of the molecule as well as the limited tolerance to calcium and magnesium.

Cationic surfactants employ primary, secondary, or tertiary amines or quaternary ammonium groups as the hydrophilic or water soluble group.

Nonionic surfactants are materials which have no charge when the material is dissolved in an aqueous medium. The hydrophilic tendency is derived from oxygen atoms in the molecule which hydrate by hydrogen bonding to water molecules present in the solute. The strongest hydrophilic moiety in this class of surfactants is the ether linkage, and there must be a plurality of these linkages present to render the compound sufficiently water soluble to permit the compound to exhibit surface activity. Polyoxyethylene surfactants having the following recurring ether linkages are examples of hydrophilic moieties for nonionic surfactants.

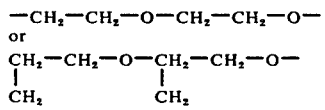

A nonionic surfactant molecule may have more than one chain containing ether linkages and generally as much as 60 to 70 percent by weight of the molecule must be in the form of ether linkage containing chains in order to render the molecule sufficiently water soluble for it to function as a surfactant.

Nonionic surfactants are more efficient in the presence of high concentrations of calcium and magnesium than are either anionic or cationic surfactants and it is possible to conduct a surfactant flood operation in a subterranean limestone formation or other subterranean petroleum containing formation when the formation water contains above 500 parts per million of calcium and/or magnesium ions. Although they cannot tolerate calcium and/or magnesium levels of the upper part of the hardness range encountered in limestone formations, nonionic surfactants are also not particularly desirable for use as a sole surfactant because of their high cost per unit weight and low surface activity.

The nonionic surfactants useful in our invention are alkoxylated asphalts described above. The optimum concentration of these materials which constitute the novel surfactant system of our invention will vary to a degree depending on the hardness and other characteristics of the aqueous environment in which it is to be used. Ideally, this should be determined by tests utilizing the actual formation water in which the material will be used generally from about 0.05 to about 5.0 percent and preferably from about 1.0 to about 3.0 percent by weight of the alkoxylated asphalt surfactant and from about 0.05 to about 5.0 percent and preferably from about 1.0 to about 3.0 percent by weight of the anionic surfactant will be effective above 500 parts per million hardness range of the aqueous environment. The ratio of anionic to alkoxylated asphalt surfactant may range from 0.1 to 9.0. The ratio of anionic surfactant to alkoxylated asphalt surfactant for optimum surface tension reduction is roughly inversely related to the total hardness.

In the practice of our invention, from about 2.0 to about 50.0 pore volume percent of an aqueous solution containing from about 0.05 to about 5.0 percent and preferably from about 1.0 to about 3.0 percent of an alkoxylated asphalt and from about 0.05 to about 5.0 and preferably from about 1.0 to about 3.0 percent by weight of the anionic surfactant. Specifically, an alkyl or alkylaryl sulfonate or phosphate is injected into the subterranean petroleum containing formation.

Although water injection operations will have probably taken place before the injection of the surfactant solution, it is not absolutely necessary. Water injection, however, is desirable as a first phase of the recovery program because it is less expensive to conduct a surfactant flooding program and furthermore, the injection of relatively fresh water into the formation containing connate water having high concentrations of calcium and/or magnesium will result in lowering of the connate water hardness at a point where a chosen surfactant composition will operate more effectively, although it is not always necessarily to be expected that the optimum interfacial tension and reduction will be achieved at the lowest possible total hardness. It may be that experimentation with the surfactant system of this invention will show that the ratio of surfactants and the optimum lowering of interfacial tension will occur in a narrow range of total hardness. Thus the surfactant system may be tailored to any range of hardness by simply changing the ratio of ethoxylated asphalts to anionic surfactants in the solution and also by changing the concentration of the surfactants in the aqueous medium.

In formations wherein it is known or suspected that surfactants will be absorbed from solution on to the formation rock, it is necessary to either use a preflush or sacrificial agent or to use more than the optimum concentration of surfactant as determined by capillary tests or other means. It is generally satisfactory to use up to 5 percent by weight surfactant and this surplus material need only be added to the first 10 percent or so of the surfactant slug injected.

If the viscosity of the petroleum contained in the subterranean formation is sufficiently high, the ratio of the viscosities of injected fluid to displaced fluids or mobility ratio as it is preferred to in the art, will result in an adverse sweep efficiency that will be preferable to utilize some type of additive to increase the viscosity of the injected aqueous fluid to more nearly match the viscosity of the subterranean petroleum. Hydrophilic polymers such as polyacrylamides or polysaccharides are effective for this purpose in a concentration from about 200 to about 500 parts per million in an aqueous solution. The use of this amount of polymer results in a fluid having an apparent viscosity from about 5 to about 15 centipoise which would generally improve the mobility ratio to the point that improved sweep efficiency can be achieved. It may be desirable to add a small concentration of the hydrophilic polymer to the surfactant solution, but it is generally satisfactory to follow the surfactant solution with a mobility buffer which comprises an aqueous solution of the hydrophilic polymer. This mobility buffer itself is then displaced to the formation by injecting water into the formation. Whether or not the mobility buffer solution is used, the final phase of the supplemental oil recovery operation will comprise the injection of water into the formation to displace the surfactant solution in the displaced oil through the formation to the producing well. Water injection will be continued until the water oil ratio of the producing well rises to about 30 or 40 or until the economic limit is reached.

The invention can be more fully understood by reference to the following field example which is offered only for purposes of illustration and is not intended to be limitative or restrictive of the invention which will be defined more precisely hereinafter in the claims.

FIELD EXAMPLE

A subterranean petroleum containing limestone formation is found at a depth of 9,000 feet. The limestone formation is 50 feet thick and the porosity is 30 percent. The field is exploited first by primary production, utilizing a square grid pattern with 400 foot lines facing between wells. At the conclusion of primary recovery, which recovers only 25 percent of the petroleum in place within the reservoir, injection wells are drilled in the center of the square grid to convert the field to inverted 5 spot pattern for water injection. Although a large field entails a multiplicity of the square grid patterns, each 400 feet on a side and with an injection well in the center, it is possible to analyze the entire field by considering on a single grid unit. Water is injected into the injection well and production of oil is continued from the production well until the water oil ratio reaches the economic limit. At the conclusion of the water flooding operations, only 40 percent of the original oil in place in the reservoir has been recovered, and some form of tertiary operations will be resorted to in order to obtain any significant portion of the remaining petroleum. The formation water is analyzed and found to contain 10,000 parts per million calcium and 7,000 parts per million magnesium. Capillary displacement tests are performed using actual formation water and it is determined that the maximum capillary displacement results from the use of 3.0 percent by weight anionic surfactant, a sodium dodecyl benzene sulfonate, and 2.0 percent by weight ethoxylated asphalt surfactant. Since the formation is known to adsorb both surfactants, the first 30 percent of the surfactant slug will contain 5.0 percent by weight of each surfactant and the remainder of the slug will contain 3.0 percent of each material. Assuming the pattern used results in 70 percent sweep efficiency, the total pore volume swept by the injected fluid may be calculated. A 10 percent pore volume surfactant slug is used. The surfactant solution is followed by injecting 1,000,000 gallons of an aqueous solution containing 200 parts per million of polyacrylamide, a hydrophilic polymer, to increase the viscosity of the injected aqueous fluid to about 8 centipoise. Finally, water is injected into the formation to displace the surfactant thickened water solution and the displaced oil through the formation for the production wells. Water injection is continued until the water oil ratio rises to the economic limit, at which point the residual oil saturation is reduced to 15 percent an approximately 75 percent of the original oil in place has been recovered.

PREPARATION OF AN ETHOXYLATED ASPHALT

The following procedure describes the ethoxylation of an asphalt. The asphalt was originally obtained by deasphalting during the manufacture of lubricating oil in a vacuum reducing still. The asphalt has a melting point of 215°–300° F. and was air blown at 500° F. resulting in a hydroxyl number of 30. A 2 Parr reactor was charged with 50 gms (0.02 moles) of crushed asphalt, 1.4 gms potassium hydroxide flakes, and 500 ml of toluene. The reactor was sealed and purged several times with nitrogen. A cylinder containing the prescribed quantity of ethylene oxide was attached to the reactor in such a way as to allow the ethylene oxide to be discharged at the bottom of the reactor. The reactor temperature was then raised to approximately 160° C. Upon reaching 160° C. the ethylene oxide was added in several additions. After all the ethylene oxide had been added (15 moles) the reaction mixture was kept at 160° C. for 1 hour. The Parr reactor was then cooled and purged with nitrogen. The toluene was evaporated leaving the ethoxylated asphalt product. This product was used in the data shown in Table I and II.

EXPERIMENTAL

The following capillary displacement tests were performed using the sodium salt of dodecyl benzene sulfonate (sulfonate) with the ethoxylated asphalt prepared above as co-surfactant.

Capillary displacement tests provides a convenient and accurate method for determining the optimum concentration of surfactants and the optimum hardness and salinity ranges for the chemical system employed. The tests are performed by filling a number of closed and capillary tubes with the particular crude oil being studied, and submerging the capillary tubes horizontally into the desired aqueous phase. In the instance of the subject series of tests, the aqueous phase comprised the indicated mixture of synthetic connate water in fresh water plus the surfactant mixture being evaluated. In each instance of displacement of oil by the aqueous phase, a meniscus is formed at the oil-water interface. The only force tending to displace oil from the capillary tube was the force resulting from the difference in specific gravities of the two fluids. This force was offset by the interfacial tension between the oil and formation water. When the surfactant composition was successful in producing a movement in the meniscus, the distance traveled by the meniscus in millimeters in a 5 minute exposure interval in the chemical system is recorded.

In Table I the sulfonate concentration remained constant and the salinity was kept constant by varying the amount of distilled water to maintain a constant total volume of 20 ml. Ethoxylated asphalt concentration was varied from 0.1 to 1.75%. Significant capillary displacements were obtained at ethoxylated asphalt concentrations of 0.75 – 1.25%. Mallet water contains 77,000 ppm total dissolved solids including 5,200 ppm $Ca^{++}$ and 1,800 ppm $Mg^{++}$. The (a) readings were taken without the pH adjustment and the (b) readings were taken at an adjusted pH of 8.

In Table II the concentration of ethoxylated asphalts was kept constant at 1.0% and sulfonate concentration was varied at constant salinity. Significant capillary displacement occurred at sulfonate concentrations of 0.2 to 1.0%.

Table III show capillary displacement results obtained at constant concentrations of sulfonate and ethoxylated asphalt while varying the salinity. BSB water contains 220,000 ppm total dissolved solids including 15,000 ppm $Ca^{++}$ and 4,200 ppm $Mg^{++}$. As before the total volume was maintained at 20 md. Significant capillary displacement occurred in the salinity range of 44,000 to 110,000 ppm total dissolved solids (3,000 to 7,500 ppm $Ca^{++}$ and 840 to 2,100 ppm $Mg^{++}$).

TABLE II

| Test No. | Dodecyl Benzene Sulfonate | Ethoxylated Asphalt | Mallet $H_2O$ | Deionized $H_2O$ | Capillary Displacement (mm) 300 sec. | 600 sec. |
|---|---|---|---|---|---|---|
| 1 | 0.2 ml | 2.0 ml | 14.5 ml | 3.3 ml | (a) 0.0 | 0.2 |
|   |        |        |         |        | (b) 0.5 | 0.5 |
| 2 | 0.4 ml | 2.0 ml | 14.5 ml | 3.1 ml | (a) 0.0 | 0.0 |
|   |        |        |         |        | (b) 2.7 | 2.7 |
| 3 | 0.6 ml | 2.0 ml | 14.5 ml | 2.9 ml | (a) 6.7 | 5.4 |
|   |        |        |         |        | (b) 7.3 | 7.8 |
| 4 | 0.8 ml | 2.0 ml | 14.5 ml | 2.7 ml | (a) 0.0 | 0.0 |
|   |        |        |         |        | (b) 8.0 | 10.7 |
| 5 | 1.0 ml | 2.0 ml | 14.5 ml | 2.5 ml | (a) 7.0 | 10.8 |
|   |        |        |         |        | (b) 8.0 | 10.5 |
| 6 | 1.5 ml | 2.0 ml | 14.5 ml | 2.0 ml | (a) 5.9 | 8.3 |
|   |        |        |         |        | (b) 6.0 | 7.3 |
| 7 | 2.0 ml | 2.0 ml | 14.5 ml | 1.5 ml | (a) 0.0 | 0.0 |
|   |        |        |         |        | (b) 4.2 | 4.9 |
| 8 | 2.5 ml | 2.0 ml | 14.5 ml | 1.0 ml | (a) 0.0 | 0.0 |
|   |        |        |         |        | (b) 0.0 | 0.0 |
| 9 | 3.0 ml | 2.0 ml | 14.5 ml | 0.5 ml | (a) 0.0 | 0.0 |
|   |        |        |         |        | (b) 0.0 | 0.0 |
| 10 | 3.5 ml | 2.0 ml | 14.5 ml | 0.0 ml | (a) 0.0 | 0.0 |
|   |        |        |         |        | (b) 0.0 | 0.0 |

TABLE I

| Test No. | Dodecyl Benzene Sulfonate | Ethoxylated Asphalt | Mallet $H_2O$ | Deionized $H_2O$ | Capillary Displacement (mm) 300 sec. | 600 sec. |
|---|---|---|---|---|---|---|
| 1 | 0.8 ml | 0.2 ml | 15.7 ml | 3.3 ml | (a) 0.1 | 0.1 |
| 2 | 0.8 ml | 0.4 ml | 15.7 ml | 3.1 ml | (a) 0.0 | 0.0 |
|   |        |        |         |        | (b) 0.6 | 0.9 |
| 3 | 0.8 ml | 0.6 ml | 15.7 ml | 2.9 ml | (a) 0.0 | 0.0 |
|   |        |        |         |        | (b) 0.05 | 0.05 |
| 4 | 0.8 ml | 0.8 ml | 15.7 ml | 2.7 ml | (a) 0.0 | 0.0 |
|   |        |        |         |        | (b) 0.3 | 0.3 |
| 5 | 0.8 ml | 1.0 ml | 15.7 ml | 2.5 ml | (a) 0.2 | 0.3 |
|   |        |        |         |        | (b) 0.5 | 0.6 |
| 6 | 0.8 ml | 1.5 ml | 15.7 ml | 2.0 ml | (a) 6.9 | 7.3 |
|   |        |        |         |        | (b) 6.8 | 7.4 |
| 7 | 0.8 ml | 2.0 ml | 15.7 ml | 1.5 ml | (a) 7.9 | 11.0 |
|   |        |        |         |        | (b) 10.9 | 12.2 |
| 8 | 0.8 ml | 2.5 ml | 15.7 ml | 1.0 ml | (a) 3.3 | 2.5 |
|   |        |        |         |        | (b) 8.8 | 9.2 |
| 9 | 0.8 ml | 3.0 ml | 15.7 ml | 0.5 ml | (a) 0.0 | 0.2 |
|   |        |        |         |        | (b) 0.0 | 0.0 |
| 10 | 0.8 ml | 3.5 ml | 15.7 ml | 0.0 ml | (a) 0.1 | 0.1 |
|   |        |        |         |        | (b) 0.5 | 0.5 |

TABLE III

| Test No. | Dodecyl Benzene Sulfonate | Ethoxylated Asphalt | BSB Water | Deionized $H_2O$ | Capillary Displacement (mm) 300 sec. | 600 sec. |
|---|---|---|---|---|---|---|
| 1 | 1.0 ml | 2.0 ml | 2.0 ml | 15.0 ml | (a) 0.0 | 0.0 |
|   |        |        |        |         | (b) 4.0 | 6.5 |
| 2 | 1.0 ml | 2.0 ml | 3.0 ml | 14.0 ml | (a) 0.0 | 0.0 |
|   |        |        |        |         | (b) 0.0 | 1.5 |
| 3 | 1.0 ml | 2.0 ml | 3.5 ml | 13.5 ml | (a) 0.0 | 0.0 |
|   |        |        |        |         | (b) 0.0 | 0.0 |
| 4 | 1.0 ml | 2.0 ml | 4.0 ml | 13.0 ml | (a) 2.2 | 2.5 |
|   |        |        |        |         | (b) 10.2 | 13.6 |
| 5 | 1.0 ml | 2.0 ml | 4.5 ml | 12.5 ml | (a) 0.0 | 0.0 |
|   |        |        |        |         | (b) 8.9 | 10.6 |
| 6 | 1.0 ml | 2.0 ml | 5.0 ml | 12.0 ml | (a) 0.0 | 0.0 |

TABLE III-continued

| Test No. | Dodecyl Benzene Sulfonate | Ethoxylated Asphalt | BSB Water | Deionized H₂O | Capillary Displacement (mm) 300 sec. | 600 sec. |
|---|---|---|---|---|---|---|
|  |  |  |  |  | (b) 10.6 | 13.6 |
| 7 | 1.0 ml | 2.0 ml | 5.5 ml | 11.5 ml | (a) 8.5 | 10.3 |
|  |  |  |  |  | (b) 8.7 | 10.3 |
| 8 | 1.0 ml | 2.0 ml | 6.0 ml | 11.0 ml | (a) 6.5 | 8.0 |
|  |  |  |  |  | (b) 6.8 | 7.3 |
| 9 | 1.0 ml | 2.0 ml | 6.5 ml | 10.5 ml | (a) 3.0 | 3.0 |
|  |  |  |  |  | (b) 6.6 | 7.5 |
| 10 | 1.0 ml | 2.0 ml | 7.0 ml | 10.0 ml | (a) 6.3 | 6.5 |
|  |  |  |  |  | (b) 7.0 | 9.5 |
| 11 | 1.0 ml | 2.0 ml | 10.0 ml | 7.0 ml | (a) 0.8 | 2.5 |
|  |  |  |  |  | (b) 3.3 | 4.4 |
| 12 | 1.0 ml | 2.0 ml | 14.0 ml | 3.0 ml | (a) 0.3 | 1.0 |
|  |  |  |  |  | (b) 0.1 | 0.3 |
| 13 | 1.0 ml | 2.0 ml | 17.0 ml | 0.0 ml | (a) 0.5 | 0.8 |
|  |  |  |  |  | (b) 0.2 | 0.2 |

None of the solutions in Tables I, II, and III showed any precipitation. In the absence of ethoxylated asphalt, dodecyl benzene sulfonate was observed to precipitate out on contacting either the mallet water or the BSB water.

We claim:

1. In a method for recovering oil from a subterranean formation containing oil and having an injection well and a production well wherein an aqueous surfactant solution is injected into the injection well in order to drive the oil to the production well where it is produced, said formation containing water having a calcium and/or magnesium ion concentration above about 500 parts per million the improvement which comprises:
injecting water soluble alkoxylated asphalts into the injection well in admixture with an anionic surfactant wherein the asphalt is alkoxylated with alkylene oxides selected from the group consisting of ethylene oxide and propylene oxide and wherein the anionic surfactant and alkoxylated asphalt are present in the aqueous solution in amounts ranging from about 0.05 to 5.0 weight percent each.

2. A method as in claim 1 wherein the asphalt is alkoxylated with a mixture of ethylene oxide and propylene oxide.

3. A method as in claim 1 wherein the asphalt is alkoxylated with ethylene oxide.

4. In a method for recovering oil from a subterranean formation containing oil and having an injection well and a production well wherein an aqueous surfactant is injected into the injection well in order to drive the oil to the production well where it is produced, said formation containing water having a calcium and/or magnesium ion concentration above about 500 parts per million the improvement which comprises:
injecting water soluble alkoxylated asphalts into the injection well wherein the asphalts are alkoxylated with alkylene oxides selected from the group consisting of ethylene oxide and propylene oxides in admixture with a surfactant comprising an anionic surfactant having one of the following general formulas:

wherein R is an alkyl radical, linear or branched, having from 5 to 25 and preferably from 8 to 14 carbon atoms, X is either a phosphate (PO₄) or sulfonate (SO₃), and Y is a monovalent cation selected from the group consisting of sodium, potassium and ammonium or (b) 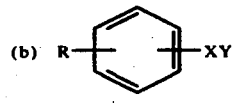

wherein R, X and Y have the same meaning as above and wherein the anionic surfactant and alkoxylated asphalt are present in the aqueous solution in amounts ranging from about 0.05 to about 5.0 weight percent each.

5. A method as in claim 4 wherein the anionic surfactant is the sodium salt of dodecyl benzene sulfonate.

6. A method as in claim 4 wherein the asphalt is ethoxylated.

* * * * *